(12) United States Patent
Kleman

(10) Patent No.: US 9,024,808 B2
(45) Date of Patent: May 5, 2015

(54) FILLING LEVEL DETERMINATION USING TRANSMIT SIGNALS WITH DIFFERENT FREQUENCY STEPS

(71) Applicant: Rosemount Tank Radar AB, Goteborg (SE)

(72) Inventor: Mikael Kleman, Vreta Kloster (SE)

(73) Assignee: Rosemount Tank Radar AB, Gothenburg (SE)

( * ) Notice: Subject to any disclaimer, the term of this patent is extended or adjusted under 35 U.S.C. 154(b) by 264 days.

(21) Appl. No.: 13/788,738

(22) Filed: Mar. 7, 2013

(65) Prior Publication Data

US 2014/0253366 A1  Sep. 11, 2014

(51) Int. Cl.
*G01F 23/284* (2006.01)
*G01S 13/08* (2006.01)
(Continued)

(52) U.S. Cl.
CPC .......... *G01F 23/284* (2013.01); *G01S 2007/356* (2013.01); *G01F 23/0069* (2013.01); *G01S 13/38* (2013.01); *G01S 13/88* (2013.01)

(58) Field of Classification Search
CPC . G01F 23/0061; G01F 23/0069; G01F 23/22; G01F 23/28; G01F 23/284; G01S 7/02; G01S 7/35; G01S 7/352; G01S 2007/356; G01S 13/02; G01S 13/06; G01S 13/08; G01S 13/32; G01S 13/36; G01S 13/38; G01S 13/88
USPC ......... 342/118, 124, 128–133, 165, 173–175, 342/192–197, 21, 22, 27, 28, 42, 44, 342/89–103; 702/1, 19; 600/300, 407, 437, 600/458; 324/600, 629, 637, 642, 644, 647, 324/648; 73/863, 864, 864.01, 864.24, 865, 73/290 R, 304 R, 304 C
See application file for complete search history.

(56) References Cited

U.S. PATENT DOCUMENTS 4,603,331 A * 7/1986 Wehner .......................... 342/192
4,646,090 A * 2/1987 Mawhinney ..................... 342/44
(Continued)

FOREIGN PATENT DOCUMENTS

WO  2004005960 A1  1/2004
WO  2012159682 A1  11/2012

OTHER PUBLICATIONS

Bin Sai et al., "Advanced High Precision Radar Gauge for Industrial Applications", Radar 2006: Proceedings of 2006 CIE International Conference on Radar; Oct. 16-19, 2006, Shanghai, China, IEEE Operations Center, Piscataway, NJ, Oct. 1, 2006, pp. 1-4, XP031073340, ISBN: 978-0-7803-9582-4.
(Continued)

*Primary Examiner* — Bernarr Gregory
(74) *Attorney, Agent, or Firm* — Westman, Champlin & Koehler, P.A.

(57) ABSTRACT

A method of determining a filling level comprising transmitting a first transmit signal exhibiting a first ratio between bandwidth number of frequencies; receiving a first reflection signal; mixing the first transmit signal and the first reflection signal to form a first intermediate frequency signal; and determining a first data set indicative of a first set of surface echo candidates based on the first intermediate frequency signal. The method further comprises transmitting a second transmit signal exhibiting a second ratio between bandwidth and number of frequencies being different from the first ratio; receiving a second reflection signal; mixing the second transmit signal and the second reflection signal to form a second intermediate frequency signal; and determining a second data set indicative of a second set of surface echo candidates based on the second intermediate frequency signal. The filling level determined based on subsets of the first and second sets.

14 Claims, 6 Drawing Sheets

(51) Int. Cl.
  *G01S 13/38* (2006.01)
  *G01F 23/00* (2006.01)
  *G01S 13/00* (2006.01)
  *G01S 7/35* (2006.01)
  *G01S 13/88* (2006.01)

(56) References Cited

U.S. PATENT DOCUMENTS

| | | | | |
|---|---|---|---|---|
| 4,729,245 | A * | 3/1988 | Hansman, Jr. | 73/865 |
| 4,977,786 | A * | 12/1990 | Davis | 73/864.24 |
| 5,012,683 | A * | 5/1991 | Davis | 73/864.24 |
| 5,021,791 | A * | 6/1991 | Hurd | 342/93 |
| 6,652,463 | B2 * | 11/2003 | Hunt et al. | 600/458 |
| 7,053,630 | B2 * | 5/2006 | Westerling et al. | 324/644 |
| 8,193,974 | B2 | 6/2012 | Logan et al. | 342/203 |
| 8,497,799 | B2 * | 7/2013 | Kleman | 342/124 |
| 8,933,834 | B2 * | 1/2015 | Nakanishi et al. | 342/118 |
| 2007/0236385 | A1 | 10/2007 | Kleman et al. | |
| 2011/0163910 | A1 | 7/2011 | Sai | 342/124 |
| 2011/0307181 | A1 * | 12/2011 | Nagae | 702/19 |
| 2012/0299767 | A1 | 11/2012 | Kleman | 342/124 |

OTHER PUBLICATIONS

International Search Report and Written Opinion of International Application No. PCT/EP2014/054235, dated May 22, 2014 (13 pages).

* cited by examiner

FILLING LEVEL DETERMINATION USING TRANSMIT SIGNALS WITH DIFFERENT FREQUENCY STEPS

FIELD OF THE INVENTION

The present invention relates to a radar level gauge system, and to a method of determining a filling level of a product in a tank.

BACKGROUND OF THE INVENTION

Since the radar level gauging was developed as a commercial product in the 1970's and 1980's, frequency modulated continuous wave (FMCW) has been the dominating measuring principle for high accuracy applications. An FMCW measurement comprises transmitting into the tank a signal which is swept over a frequency range in the order of a few GHz. For example, the signal can be in the range 24-27 GHz, or 9-10.5 GHz. The transmitted signal is reflected by the surface of the contents in the tank (or by any other impedance transition) and an echo signal, which has been delayed a certain time, is returned to the gauge. The echo signal is mixed with the transmitted signal to generate a mixer signal, having a frequency equal to the frequency change of the transmitted signal that has taken place during the time delay. If a linear sweep is used, this difference frequency, also referred to as an intermediate frequency (IF), is proportional to the distance to the reflecting surface. The mixer signal is often referred to as an IF signal.

More recently, the FMCW principle has been improved, and today typically involves transmitting not a continuous sweep but a signal with stepped frequency with practically constant amplitude. When the transmitted and received signals are mixed, each frequency step will provide one constant piece of a piecewise constant IF signal.

The distance to the reflecting surface is then determined using the frequency of the IF signal in a similar way as in a conventional FMCW system. Typical values can be 200-300 IF periods at 30 m distance divided in 1000-1500 steps.

It is noted that also a continuous IF signal, resulting from a continuous frequency sweep, may be sampled in order to allow digital processing.

Although highly accurate, conventional FMCW systems (continuous as well as stepped) are relatively power hungry, making them less suitable for applications where power is limited. Examples of such applications include field devices powered by a two-wire interface, such as a 4-20 mA loop, and wireless devices powered by an internal power source (e.g. a battery or a solar cell).

The main power consumer is the microwave module, which, due to the requirements on frequency accuracy, requires relatively high power to generate and emit the microwave energy during each sweep. Between sweeps suitable means can be used to store power, so that a lower average power can used to power the microwave module for the duration of the sweep. However, due to space limitations and intrinsic safety (IS) requirements, such power storage capacity is severely limited. Therefore, it is crucial to limit the active period of the microwave module, i.e. to limit the duration of the sweep. Further, it is desirable to limit the sampling rate, in order to reduce the power consumption in the analogue signal processing and the A/D conversion. Finally, from a performance point of view, it is advantageous to have a wide bandwidth, providing a more robust measurement.

In a radar level gauge system using a time sequence of discrete and mutually different frequencies as the transmit signal, the active time of the microwave module can be reduced by reducing the number of frequencies in the transmit signal.

However, a reduced number of frequencies over a maintained bandwidth may result in a distorted IF signal, which may in turn introduce false echoes that could be mistaken for the surface echo.

Accordingly, reducing the power consumption of the radar level gauge system by reducing the number of frequencies in the transmit signal may result in a reduced reliability of the filling level determination.

SUMMARY

In view of the above, a general object of the present invention is to provide for an improved filling level determination by a radar level gauge system using a time sequence of discrete and mutually different frequencies as the transmit signal, in particular to provide for a more favorable tradeoff between power consumption and reliability of the filling level determination.

According to a first aspect of the present invention, it is therefore provided a method of determining a filling level of a product in a tank using a radar level gauge system, comprising the steps of: transmitting towards a surface of the product a first transmit signal comprising a time sequence of a first number of discrete and mutually different frequencies defining a first bandwidth of the first transmit signal, the first transmit signal exhibiting a first ratio between the first bandwidth and the first number of discrete and mutually different frequencies; receiving a first reflection signal resulting from reflection of the first transmit signal at impedance discontinuities encountered by the first transmit signal; mixing the first transmit signal and the first reflection signal to form a first intermediate frequency signal; determining a first data set indicative of a first set of surface echo candidates based on the first intermediate frequency signal; transmitting towards a surface of the product a second transmit signal comprising a time sequence of a second number of discrete and mutually different frequencies defining a second bandwidth of the second transmit signal, the second transmit signal exhibiting a second ratio between the second bandwidth and the second number of discrete and mutually different frequencies being different from the first ratio; receiving a second reflection signal resulting from reflection of the second transmit signal at impedance discontinuities encountered by the second transmit signal; mixing the second transmit signal and the second reflection signal to form a second intermediate frequency signal; determining a second data set indicative of a second set of surface echo candidates based on the second intermediate frequency signal; identifying, based on a comparison between the first data set and the second data set, subsets of surface echo candidates from the first set of surface echo candidates and the second set of surface echo candidates indicating reflection of the transmit signal at impedance discontinuities at the same level in the tank; and determining the filling level based on the subsets of surface echo candidates from the first set of surface echo candidates and the second set of surface echo candidates.

The present invention is based on the realization that "false echoes" resulting from distortion of the intermediate frequency signal can be identified and disregarded from the filling level determination using two (or more) transmit signals with different frequency steps. Although both transmit signals may result in distortion of the intermediate frequency signal, the distortion will be different, which results in "false echoes" that indicate different levels in the tank. Real echoes, on the other hand, will result indicate the same levels in the tank for both transmit signals.

Since the purpose of the second transmit signal is to identify "false echoes" and not to provide a very distinct surface echo with high precision, fewer different frequencies may be used for the second transmit signal than for the first transmit signal, which means that a reduction in the power consumption can be achieved as compared to using a sufficient number of different frequencies to reduce the distortion of the intermediate frequency signal to such a level that there are no harmful "false echoes".

According to various embodiments of the method according to the present invention, a frequency difference between adjacent ones of the first number of discrete and mutually different frequencies is an integer multiple of the first ratio between the first bandwidth and the first number of discrete and mutually different frequencies; and a frequency difference between adjacent ones of the second number of discrete and mutually different frequencies is an integer multiple of the second ratio between the second bandwidth and the second number of discrete and mutually different frequencies.

The discrete and mutually different frequencies of either or both of the first and second transmit signals may be provided in order from lowest to highest (or from highest to lowest) frequency in the time sequence. The first and/or second transmit signal will then be a so-called stepped frequency sweep.

Alternatively, the discrete and mutually different frequencies may be provided in arbitrary order in the time sequence. As long as the order of the frequencies is known for a transmit signal, a data set indicative of a set of surface echo candidates can be determined based on the intermediate frequency signal formed using the transmit signal.

In various embodiments of the method according to the present invention, each discrete and mutually different frequency in said first transmit signal may be transmitted for a first time duration; and each discrete and mutually different frequency in said second transmit signal may be transmitted for a second time duration. This simplifies generation of the transmit signals and sampling of the intermediate frequency signal.

Advantageously, the first time duration may equal the second time duration, whereby generation of the transmit signals and sampling of the intermediate frequency signal can be simplified further.

According to various embodiments, each of the first and second intermediate frequency signals may be transformed from the time domain to the frequency domain, for example using FFT (Fast Fourier Transform) or any other suitable transformation scheme, to form a first frequency spectrum and a second frequency spectrum.

Furthermore, the first frequency spectrum and the second frequency spectrum may advantageously be transformed to the distance domain to facilitate a comparison of the distances to the surface echo candidates obtained based on the first transmit signal and the second transmit signal, respectively.

Accordingly, the step of determining the first data set may further comprise the step of transforming the first frequency spectrum to a first echo representation indicating a distance to each of the surface echo candidates in the first set of surface echo candidates; and the step of determining the second data set may further comprise the step of transforming the second frequency spectrum to a second echo representation indicating a distance to each of the surface echo candidates in the second set of surface echo candidates.

A "distance" to an impedance discontinuity (such as the surface of the product in the tank), or a "level" in the tank of the impedance discontinuity should here be understood to be equivalent to, for example, a time-of-flight of the transmit signal from a reference position at the top of the tank to the impedance discontinuity and back.

According to a second aspect of the present invention, there is provided a radar level gauge system for determining a filling level of a product in a tank, the radar level gauge system comprising: a microwave signal source controllable to generate a first transmit signal and a second transmit signal; a propagating device connected to the microwave signal source and arranged to propagate the first transmit signal and the second transmit signal towards a surface of the product in the tank, and to propagate a first reflection signal resulting from reflection of the first transmit signal at impedance discontinuities encountered by the first transmit signal and a second reflection signal resulting from reflection of the second transmit signal at impedance discontinuities encountered by the second transmit signal back from the surface; a mixer connected to the microwave signal source and to the propagating device and configured to mix the first transmit signal and the first reflection signal to form a first intermediate frequency signal, and to mix the second transmit signal and the second reflection signal to form a second intermediate frequency signal; and processing circuitry connected to the microwave signal source and to the mixer, the processing circuitry comprising: a microwave signal source controller configured to control the microwave signal source to generate: the first transmit signal comprising a time sequence of a first number of discrete and mutually different frequencies defining a first bandwidth of the first transmit signal, the first transmit signal exhibiting a first ratio between the first bandwidth and the first number of discrete and mutually different frequencies; and the second transmit signal comprising a time sequence of a second number of discrete and mutually different frequencies defining a second bandwidth of the second transmit signal, the second transmit signal exhibiting a second ratio between the second bandwidth and the second number of discrete and mutually different frequencies being different from the first ratio; a signal processor configured to: determine a first data set indicative of a first set of surface echo candidates based on the first intermediate frequency signal received from the mixer; and determine a second data set indicative of a second set of surface echo candidates based on the second intermediate frequency signal received from the mixer; a comparator configured to compare the first data set and the second data set to identify subsets of surface echo candidates from the first set of surface echo candidates and the second set of surface echo candidates indicating reflection of the transmit signal at impedance discontinuities at the same level in the tank; and a determinator configured to determine the filling level based on the subsets of surface echo candidates from the first set of surface echo candidates and the second set of surface echo candidates.

It should be noted that the signal propagation device may be any suitable radiating antenna or transmission line probe. Examples of antennas include a horn antenna, a rod antenna, an array antenna and a parabolic antenna, etc. Examples of transmission line probes include a single line probe (Goubau probe), a twin line probe and a coaxial probe etc.

It should also be noted that the processing circuitry may be provided as one device or several devices working together.

Furthermore, the level gauge system may advantageously further comprise a local energy store for providing electrical energy for operation of said level gauge system. The local energy store may, for example, comprise a battery, a capacitor, and/or a super capacitor.

Moreover, the level gauge system may further comprise wireless communication circuitry, such as a radio transceiver, for wireless communication with a remote system.

Further embodiments of, and effects obtained through this second aspect of the present invention are largely analogous to those described above for the first aspect of the invention.

In summary, the present invention thus relates to a method of determining a filling level comprising transmitting a first transmit signal exhibiting a first ratio between bandwidth number of frequencies; receiving a first reflection signal; mixing the first transmit signal and the first reflection signal to form a first intermediate frequency signal; and determining a first data set indicative of a first set of surface echo candidates based on the first intermediate frequency signal. The method further comprises transmitting a second transmit signal exhibiting a second ratio between bandwidth and number of frequencies being different from the first ratio; receiving a second reflection signal; mixing the second transmit signal and the second reflection signal to form a second intermediate frequency signal; and determining a second data set indicative of a second set of surface echo candidates based on the second intermediate frequency signal. The filling level determined based on subsets of the first and second sets.

BRIEF DESCRIPTION OF THE DRAWINGS

These and other aspects of the present invention will now be described in more detail, with reference to the appended drawings showing an exemplary embodiment of the invention, wherein.

DETAILED DESCRIPTION OF EXAMPLE EMBODIMENTS

Figure 1:
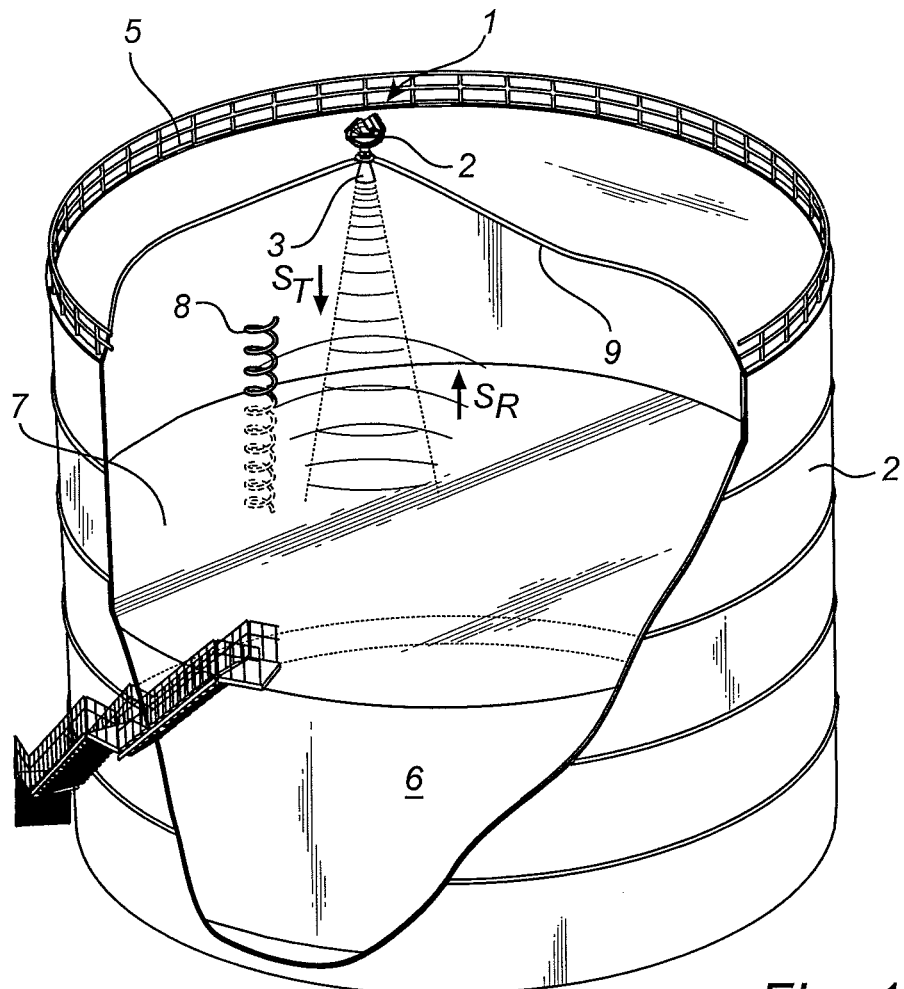
FIG. 1 schematically shows an exemplary tank with an embodiment of the radar level gauge system according to the present invention arranged to determine the filling level of a product in the tank.

FIG. 1 schematically illustrates a radar level gauge system 1 comprising a measurement unit 2 and a signal propagation device, here shown in the form of a horn antenna 3. The radar level gauge system 1 is arranged on top of a tank 5 for determining the filling level of a product 6 in the tank 5.

When measuring the filling level of the product 6 in the tank 5, the radar level gauge system 1 transmits an electromagnetic transmit signal $S_T$ by the horn antenna 3 towards the surface 7 of the product 6. The transmit signal $S_T$ will be reflected by impedance discontinuities that it encounters, including by the surface 7 of the product 6. Thus, the horn antenna 3 will receive a reflected signal $S_R$ comprising reflections at the different impedance discontinuities present in the tank 5. As will be described further below, processing of the reflected signal $S_R$ will provide a set of surface echo candidates. Among this set, one surface echo candidate may be assigned to be the surface echo.

The distance to the surface 7 of the product 6 is then determined based on the time-of-flight of the surface echo signal (from the radar level gauge system 1 to the surface 7 and back). From the time-of-flight, the distance to the surface, generally referred to as ullage, can be determined. Based on this distance (the ullage) and known dimensions of the tank 5, the filling level can be deduced.

Examples of impedance discontinuities other than the surface 7 of the product 6 may, for example, include internal structures, such as the heating coil 8 indicated in FIG. 1. The transmit signal $S_T$ may also be reflected first by the surface 7, then by the ceiling 9 of the tank 5, and finally be the surface 7 again before it is received by the horn antenna 3.

Using the radar level gauge system according to various embodiments of the present invention, the time-of-flight is determined based on the phase difference between the phase-modulated transmit signal and the surface reflection signal. This type of measurement scheme is often generally referred to as FMCW (Frequency Modulated Continuous Wave).

Figure 2:
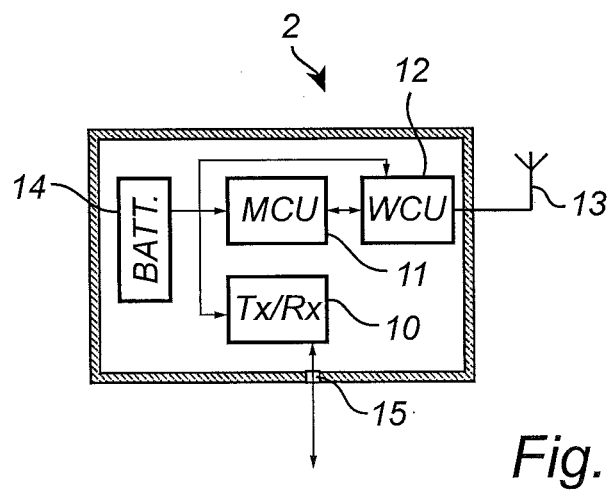
FIG. 2 is schematic illustration of the measurement unit comprised in the radar level gauge system in FIG. 1.

Referring to the schematic block diagram in FIG. 2, the measurement unit 2 of the radar level gauge system 1 in FIG. 1 comprises a transceiver 10, a measurement control unit (MCU) 11, a wireless communication control unit (WCU) 12, a communication antenna 13, an energy store, such as a battery 14, and a tank feed-through 15.

As is schematically illustrated in FIG. 2, the MCU 11 controls the transceiver 10 to generate, transmit and receive electromagnetic signals. The transmitted signals pass through the tank feed-through 15 to the horn antenna 3 (not shown in FIG. 2), and the received signals pass from the horn antenna 3 through the tank feed-through 15 to the transceiver 10.

As was briefly described above with reference to FIG. 1, the MCU 11 determines the filling level of the product 6 in the tank 5 based on the phase difference between the transmit signal $S_T$ and the reflected signal $S_R$. The filling level is provided to an external device, such as a control center from the MCU 11 via the WCU 12 through the communication antenna 13. The radar level gauge system 1 may advantageously be configured according to the so-called WirelessHART communication protocol (IEC 62591).

Although the measurement unit 2 is shown to comprise an energy store 14 and to comprise devices (such as the WCU 12 and the communication antenna 13) for allowing wireless communication, it should be understood that power supply and communication may be provided in a different way, such as through communication lines (for example 4-20 mA lines).

The local energy store need not only comprise a battery, but may alternatively, or in combination, comprise a capacitor or super-capacitor.

The radar level gauge system 1 in FIG. 1 will now be described in greater detail with reference to the schematic block diagram in FIG. 3.

Figure 3:
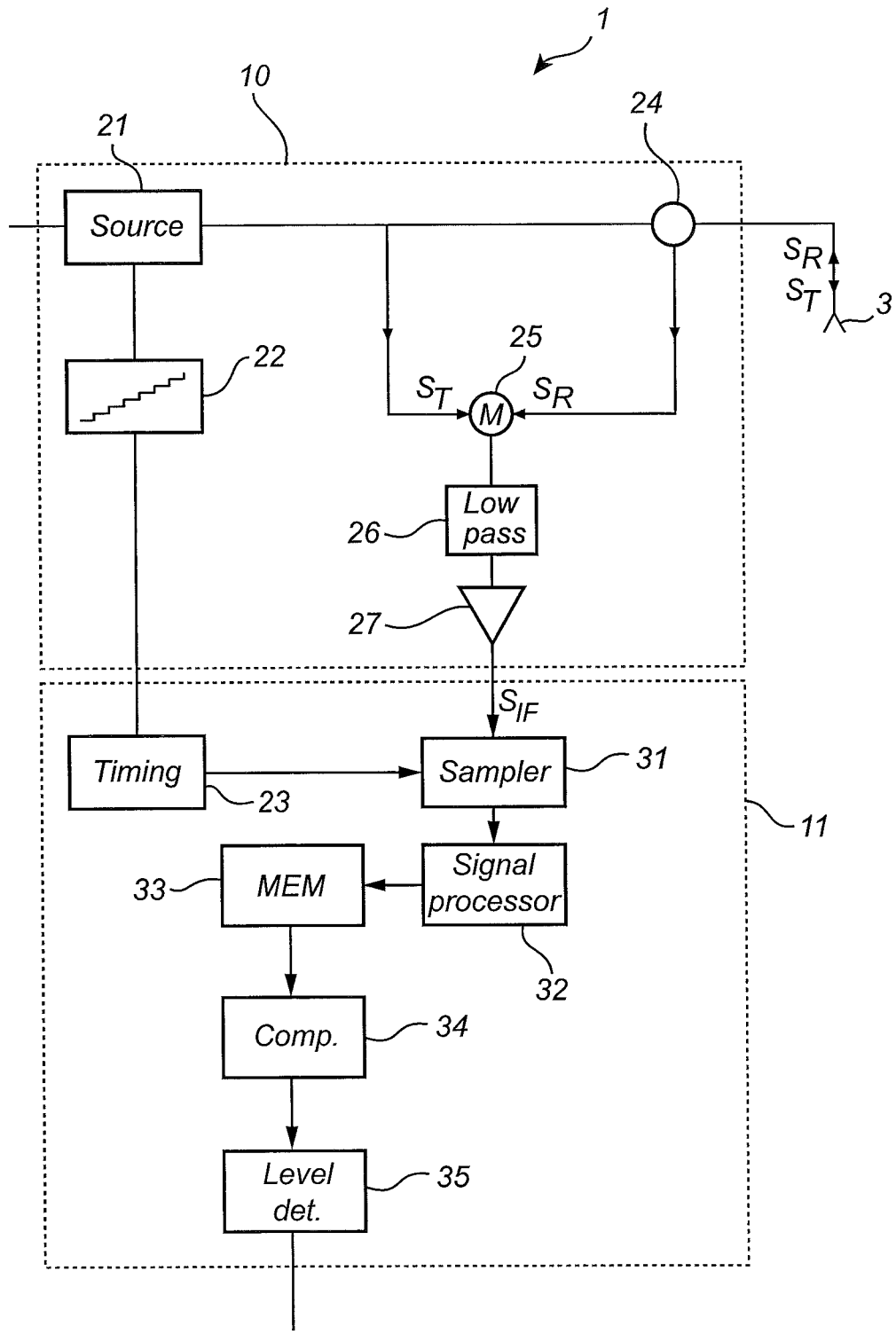
FIG. 3 is a schematic block diagram of a radar level gauge system according to an embodiment of the present invention.

Referring now to FIG. 3, there is shown a more detailed block diagram of the transceiver 10 and MCU 11 in FIG. 1 according to an embodiment of the present invention.

The transceiver 10 here includes a microwave source 21 driven by a step generator 22, in turn controlled by timing circuitry 23 forming part of the MCU 11. The microwave source 21 is connected to the antenna 3 via a power divider 24. The power divider 24 is arranged to connect a return signal from the antenna to a mixer 25, which is also connected to receive the signal from the microwave source 21. The mixer output is connected to a low pass filter 26 and an amplifier 27.

The processing circuitry 11 here includes, in addition to the timing circuitry 23 mentioned above, a sampler 31 configured to receive and sample the intermediate frequency signal $S_{IF}$ output by the mixer 25, low pass filtered by the low pass filter 26 and amplified by the amplifier 27. The sampler 31 may comprise a sample-and-hold circuit in combination with an A/D-converter, or be realized as a sigma-delta converter. The sampler 31 is controlled by the timing circuitry to be synchronized with the transmit signal $S_T$. The MCU 11 further includes a signal processor 32, a memory 33, a comparator 34 and a level determinator 35.

While the elements of the transceiver 10 are typically implemented in hardware, and form part of an integrated unit normally referred to as a microwave unit, at least some portions of the MCU 11 may typically be embodied by software modules executed by an embedded processor. The invention is not restricted to this particular realization, and any implementation found suitable to realize the herein described functionality may be contemplated.

Having described the structural configuration of the radar level gauge system 1 in FIG. 1 which is illustrated in FIG. 3, a method according to an example embodiment of the present invention will now be described with reference to FIG. 4. The block diagram in FIG. 3 will also be referred to concerning the structure of the radar level gauge system 1 in which the method is implemented, and the diagrams in FIGS. 5, 6a-c, 7a-c and 8 will be referred to when appropriate during the description of the method.

Figure 4:
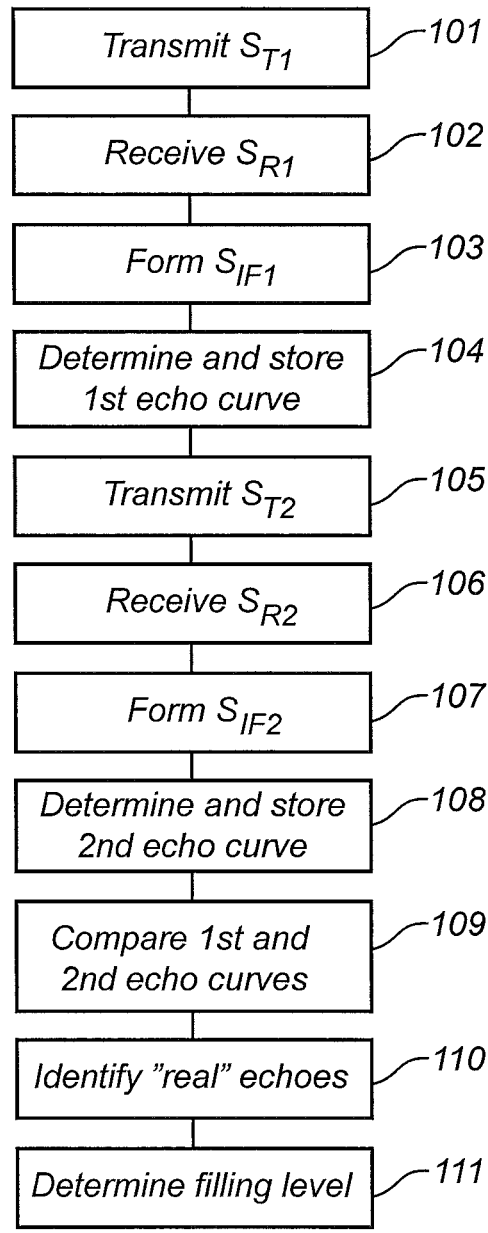
FIG. 4 is a flow-chart outlining an embodiment of the method according to the present invention.
Figure 5:
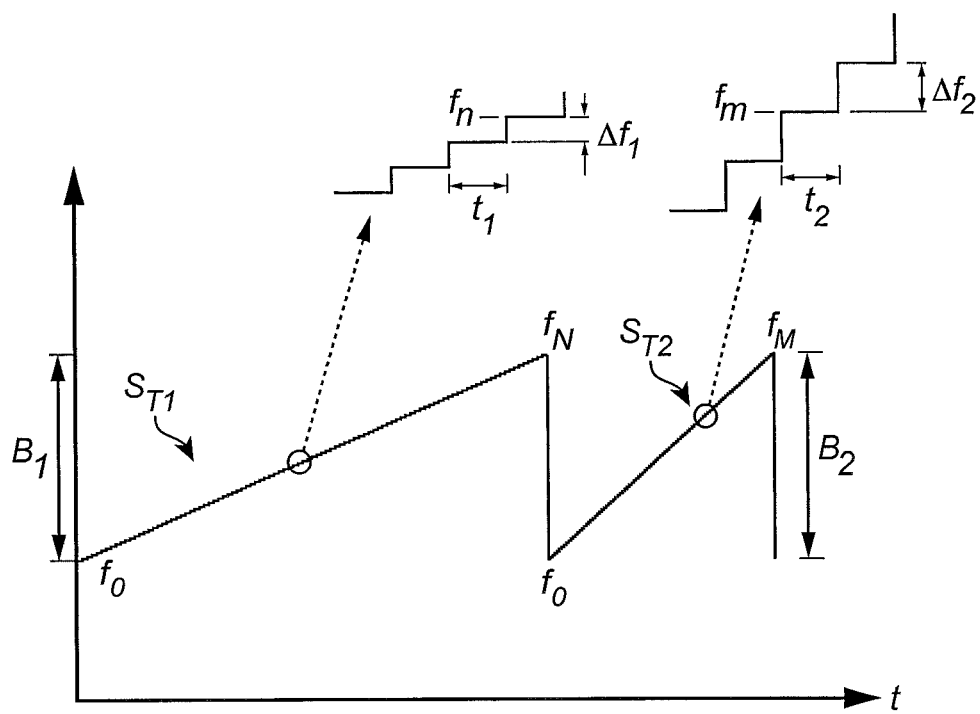
FIG. 5 schematically illustrates an example of transmit signal sequence according to an embodiment of the invention.

Turning first to FIG. 4, a first transmit signal $S_{T1}$ is transmitted in a first step 101. With reference to FIG. 3, the timing circuitry 23 controls the microwave source 21 via the step generator 22. Referring to FIG. 5, the first transmit signal $S_{T1}$ is provided in the form of a time sequence $f_0$-$f_N$ of a first number N of discrete and mutually different frequencies $f_n$. As is schematically indicated in FIG. 5, the discrete and mutually different frequencies $f_0$-$f_N$ define a first bandwidth $B_1$. Furthermore, the first transmit signal $S_{T1}$ exhibits a first ratio $\Delta f_1$ between the first bandwidth $B_1$ and the first number N of frequencies. As is shown in the enlarged portion of the first transmit signal $S_{T1}$, the first ratio $\Delta f_1$ is the frequency different between any two of the discrete and mutually different frequencies that are adjacent in terms of frequency. In this particular example, the frequencies adjacent in terms of frequency are also adjacent in the time sequence, but this is not necessarily the case. Alternatively, the discrete and mutually different frequencies may be output in an arbitrary but known order. The duration for each of the discrete frequencies in the first transmit signal $S_{T1}$ is denoted $t_1$ in FIG. 5. In embodiments of the present invention, the duration $t_1$ for which each discrete frequency $f_n$ of the first transmit signal $S_{T1}$ is transmitted may be around 10 µs, the first bandwidth may be about 1.5 GHz, and the number N of discrete and mutually different frequencies may be about 300. This means that the frequency difference $\Delta f_1$ between discrete frequencies adjacent in terms of frequency (the first ratio) may be about 5 MHz, and the total sweep time may be about 3 ms. This is a considerably faster sweep than is used in prior art radar level gauge systems, which obviously saves power. However, the relatively large frequency difference $\Delta f_1$ may result in distortion of the intermediate frequency signal $S_{IF1}$. This will be described in more detail further below.

Returning to the flow-chart in FIG. 4, the method proceeds to the next step 102 to receive a first reflection signal $S_{R1}$. The first reflection signal $S_{R1}$ results from reflection of the first transmit signal $S_{T1}$ at impedance discontinuities (such as the surface 7 and the heating coil 8 indicated in FIG. 1). Due to the time-of-flight from the radar level gauge system to the different impedance discontinuities and back, the first reflection signal $S_{R1}$ will be a delayed copy of the first transmit signal $S_{T1}$, where the portions of the reflection signal $S_{R1}$ reflected from the different impedance discontinuities will exhibit different phase differences as compared to the first transmit signal $S_{T1}$. The phase differences will, furthermore, change in steps with the changes in transmitted discrete frequency $f_n$.

Figure 6A:
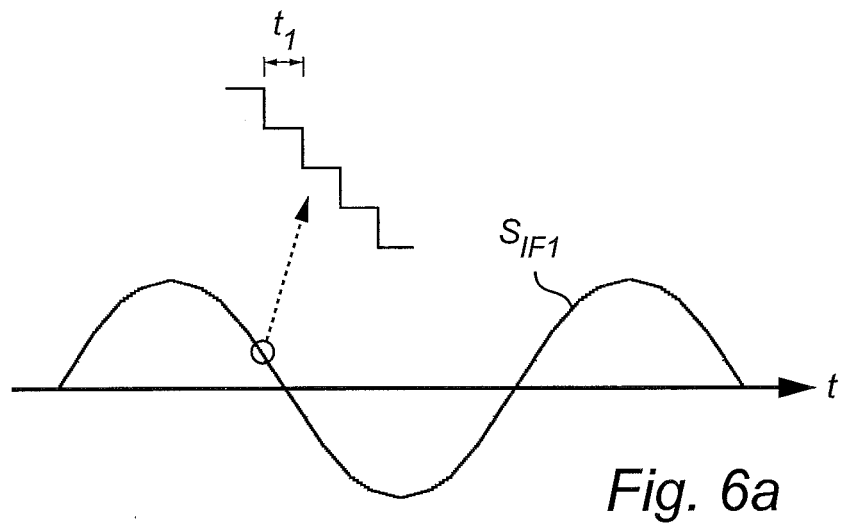
FIGS. 6a-c are diagrams showing the intermediate frequency signal and transformations of the intermediate frequency signal resulting from the first transmit signal.
Figure 6B:
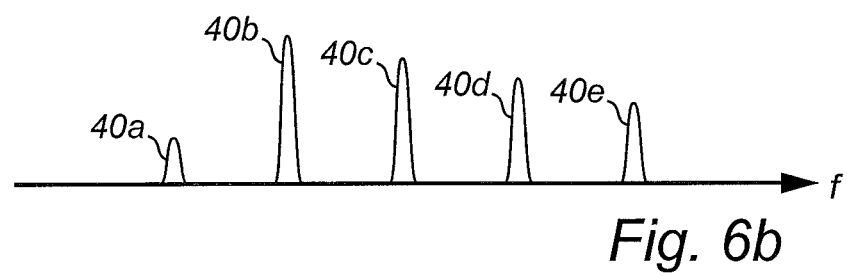
Figure 6C:
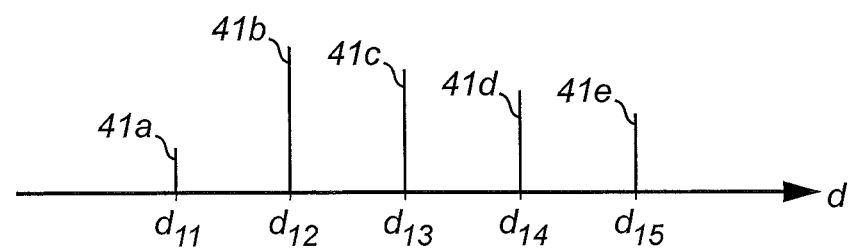

In the subsequent step 103, a first intermediate frequency signal $S_{IF1}$ is formed by combining the first transmit signal $S_{T1}$ and the first reflection signal $S_{R1}$ in the mixer 25. The first intermediate frequency signal $S_{IF1}$ is schematically shown in FIG. 6a.

If a transmit signal with a continuously varying frequency had been used, the intermediate frequency signal would have been a continuous signal comprising one frequency component for each time-of-flight corresponding to the different impedance discontinuities encountered by the transmit signal.

Since the first transmit signal $S_{T1}$ is instead a sequence of discrete frequencies $f_n$, the phase difference will vary in steps, which means that the first intermediate frequency signal $S_{IF1}$ will be piece-wise constant with the same duration of the constant portions as the duration $t_1$ of transmission of the different frequencies $f_n$ of the first transmit signal $S_{T1}$. This is schematically indicated in FIG. 6a.

For low frequency components of the first intermediate frequency signal $S_{IF1}$ (corresponding to short measuring distances), this is no problem, but higher frequency spectral components (corresponding to larger measuring distances) may be impossible to correctly obtain from the first intermediate frequency signal $S_{IF1}$—the first intermediate frequency signal $S_{IF1}$ is distorted. This in turn leads to the apparent presence of frequencies in the intermediate frequency signal $S_{IF1}$ that do not correspond to real echoes (but to "false echoes" introduced by the quantization of the first transmit signal $S_{T1}$).

Returning to the flow-chart in FIG. 4, the next step 104 is to determine and store a first echo curve. In this step, the first intermediate frequency signal $S_{IF1}$ which has been sampled by the sampler 31 in FIG. 3 is processed by the signal processor 32 in order to determine a first data set indicative of a first set of surface echo candidates. In this embodiment, the first intermediate frequency signal $S_{T1}$ in FIG. 6a is first transformed from the time domain to the frequency domain using, for example, FFT (Fast Fourier Transform). The result of the FFT operation is the frequency spectrum in FIG. 6b, where each peak 40a-e corresponds to a frequency component in the first intermediate frequency signal $S_{IF1}$.

Following transformation to the frequency domain of the first intermediate frequency signal $S_{IF1}$, the resulting frequency spectrum is transformed to a first echo curve (shown in FIG. 6c) where echoes are indicated as peaks 42a-e at different distances $d_{11}$-$d_{15}$.

Of course, the first data set referred to above need not be an echo curve as shown here, but may be any representation indicating locations of surface echo candidates 42a-e, such as, for example, a table or other equivalent representation.

The first data set is stored in memory 33.

After having determined and stored the first data set based on transmission of the first transmit signal $S_{T1}$, the procedure is repeated using a second transmit signal $S_{T2}$ through steps 105-108. Since these steps are identical to steps 101-104 that were described above for the first transmit signal $S_{T1}$, they will not be described in detail. Instead, the description will focus on the differences between the second transmit signal $S_{T2}$ and the first transmit signal $S_{T1}$ and between the results obtained when transforming the second intermediate frequency signal $S_{IF2}$.

As can be seen in FIG. 5, the second transmit signal $S_{T2}$ is different from the first transmit signal $S_{T1}$. In particular, the second frequency difference $\Delta f_2$ between any two of the discrete and mutually different frequencies $f_m$ adjacent in terms of frequency is different from the first frequency difference $\Delta f_1$ for the first transmit signal $S_{T1}$.

The second transmit signal $S_{T2}$ is provided in the form of a time sequence $f_0$-$f_M$ of a second number M of discrete and mutually different frequencies $f_m$. As is schematically indicated in FIG. 5, the discrete and mutually different frequencies $f_0$-$f_M$ define a second bandwidth $B_2$, which is here equal to the first bandwidth $B_1$. The duration for each of the discrete frequencies in the second transmit signal $S_{T2}$ is denoted $t_2$ in FIG. 5. In this particular example, the duration of transmission of the different frequencies of the second transmit signal $S_{T2}$ is the same as the duration of transmission of the different frequencies of the first transmit signal $S_{T1}$.

As can be seen in FIG. 5, the total duration or sweep time of the second transmit signal $S_{T2}$ is considerably shorter than that of the first transmit signal $S_{T1}$.

Figure 7A:
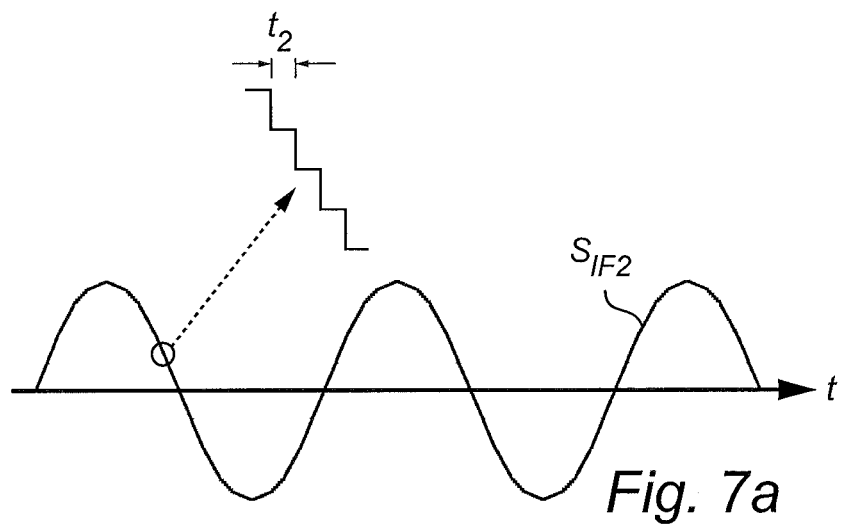
FIGS. 7a-c are diagrams showing the intermediate frequency signal and transformations of the intermediate frequency signal resulting from the first transmit signal; schematically illustrates an exemplary measurement signal formed based on the transmit signal and the surface echo signal.
Figure 7B:
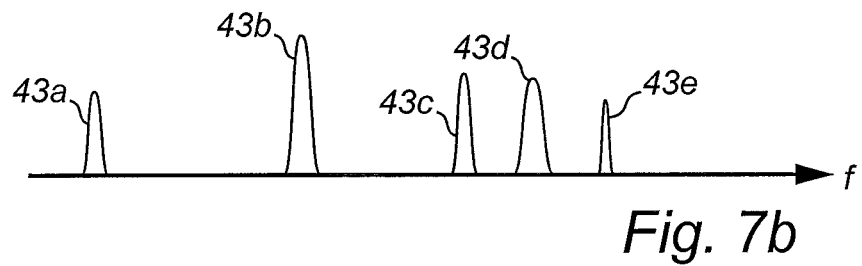
Figure 7C:
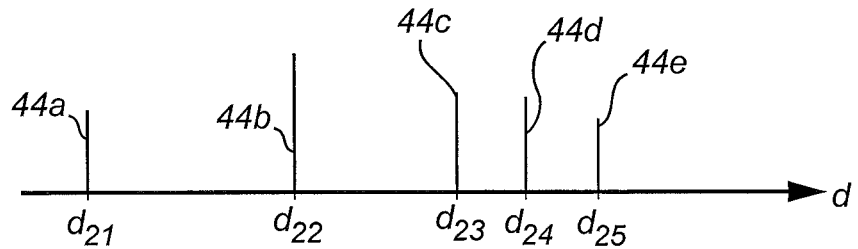

Referring to FIGS. 7a-c, mixing the second transmit signal $S_{T2}$ and the second reflection signal $S_{R2}$ results in the second intermediate frequency signal $S_{IF2}$ that is schematically shown in FIG. 7a.

Transformation of the second intermediate frequency signal $S_{IF2}$ results in the frequency spectrum in FIG. 7b with frequency components 43a-e as indicated in FIG. 7b.

Following transformation to the frequency domain of the second intermediate frequency signal $S_{IF2}$, the resulting frequency spectrum is transformed to a second echo curve (shown in FIG. 7c) where echoes are indicated as peaks 44a-e at different distances $d_{21}$-$d_{25}$. The second data set (the second echo curve) is stored in memory 33.

Figure 8:
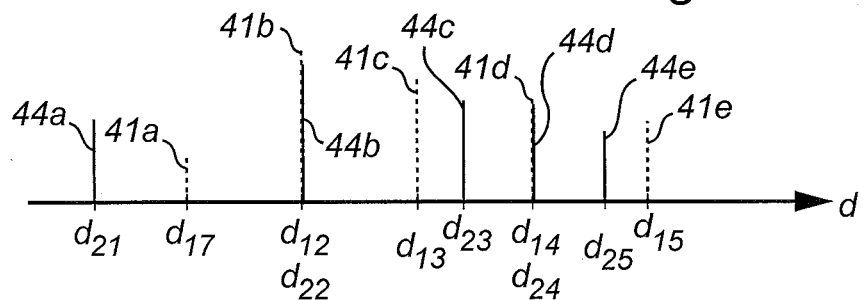
FIG. 8 is a diagram showing a combined echo curve from which the filling level is determined.

Having now determined and stored the first data set and the second data set, the method proceeds to step 109, where the first and second echo curves are compared. This is schematically illustrated in FIG. 8, where the echo curves from FIGS. 6c and 7c have been drawn in the same diagram with the same distance scale.

In the subsequent step 110, the "real" echoes, that is, echoes corresponding to reflection at impedance discontinuities in the tank 5 are identified. As is indicated in FIG. 8, the "real" echoes are at distances $d_{12}$ (=$d_{22}$) and $d_{14}$ (=$d_{24}$). The remaining echoes are "false" echoes resulting from distortion of the first $S_{IF1}$ and second $S_{IF2}$ intermediate frequency signals.

Finally, the filling level is determined by assigning one of the "real" echoes as the surface echo and taking the distance to that echo. For instance, the first echo with an amplitude higher than a threshold may be selected, in this case the first "real" echo at the distance $d_{12}$ (=$d_{21}$). As is well known to the skilled person, however, there are many other schemes and methods for assigning one surface echo candidate as the surface echo.

The person skilled in the art realizes that the present invention by no means is limited to the preferred embodiments described above. On the contrary, many modifications and variations are possible within the scope of the appended claims.

What is claimed is:

1. A method of determining a filling level of a product in a tank using a radar level gauge system, comprising the steps of:
   transmitting towards a surface of said product a first transmit signal comprising a time sequence of a first number of discrete and mutually different frequencies defining a first bandwidth of said first transmit signal, said first transmit signal exhibiting a first ratio between said first bandwidth and said first number of discrete and mutually different frequencies;
   receiving a first reflection signal resulting from reflection of said first transmit signal at impedance discontinuities encountered by said first transmit signal;
   mixing said first transmit signal and said first reflection signal to form a first intermediate frequency signal;
   determining a first data set indicative of a first set of surface echo candidates based on said first intermediate frequency signal;
   transmitting towards a surface of said product a second transmit signal comprising a time sequence of a second number of discrete and mutually different frequencies defining a second bandwidth of said second transmit signal, said second transmit signal exhibiting a second ratio between said second bandwidth and said second number of discrete and mutually different frequencies being different from said first ratio;
   receiving a second reflection signal resulting from reflection of said second transmit signal at impedance discontinuities encountered by said second transmit signal;
   mixing said second transmit signal and said second reflection signal to form a second intermediate frequency signal;
   determining a second data set indicative of a second set of surface echo candidates based on said second intermediate frequency signal;
   identifying, based on a comparison between said first data set and said second data set, subsets of surface echo candidates from said first set of surface echo candidates and said second set of surface echo candidates indicating reflection of said transmit signal at impedance discontinuities at the same level in said tank; and
   determining the filling level based on said subsets of surface echo candidates from said first set of surface echo candidates and said second set of surface echo candidates.

2. The method according to claim 1, wherein said second number of discrete and mutually different frequencies is substantially smaller than said first number of discrete and mutually different frequencies.

3. The method according to claim 2, wherein said second number of discrete and mutually different frequencies is less than half said first number of discrete and mutually different frequencies.

4. The method according to claim 1, further comprising the step of:
   assigning one of the surface echo candidates comprised in said subsets of surface echo candidates from said first set of surface echo candidates and said second set of surface echo candidates as the surface echo,
   wherein said filling level is determined based on said surface echo.

5. The method according to claim 1, wherein:
   a frequency difference between adjacent ones of said first number of discrete and mutually different frequencies is an integer multiple of said first ratio between said first bandwidth and said first number of discrete and mutually different frequencies; and a frequency difference between adjacent ones of said second number of discrete and mutually different frequencies is an integer multiple of said second ratio between said second bandwidth and said second number of discrete and mutually different frequencies.

6. The method according to claim 5, wherein:

said frequency difference between adjacent ones of said first number of discrete and mutually different frequencies equals said first ratio between said first bandwidth and said first number of discrete and mutually different frequencies; and said frequency difference between adjacent ones of said second number of discrete and mutually different frequencies equals said second ratio between said second bandwidth and said second number of discrete and mutually different frequencies.

7. The method according to claim 1, wherein:

each discrete and mutually different frequency in said first transmit signal is transmitted for a first time duration; and each discrete and mutually different frequency in said second transmit signal is transmitted for a second time duration.

8. The method according to claim 7, wherein said first time duration equals said second time duration.

9. The method according to claim 1, wherein:

said step of determining said first data set comprises the step of transforming said first intermediate frequency signal to a first frequency spectrum; and said step of determining said second data set comprises the step of transforming said second intermediate frequency signal to a second frequency spectrum.

10. The method according to claim 9, wherein:

said step of determining said first data set further comprises the step of transforming said first frequency spectrum to a first echo representation indicating a distance to each of said surface echo candidates in said first set of surface echo candidates; and said step of determining said second data set further comprises the step of transforming said second frequency spectrum to a second echo representation indicating a distance to each of said surface echo candidates in said second set of surface echo candidates.

11. The method according to claim 1, wherein said first transmit signal and said second transmit signal are consecutive transmit signals.

12. A radar level gauge system for determining a filling level of a product in a tank, said radar level gauge system comprising:

a microwave signal source controllable to generate a first transmit signal and a second transmit signal;

a propagating device connected to said microwave signal source and arranged to propagate said first transmit signal and said second transmit signal towards a surface of said product in the tank, and to propagate a first reflection signal resulting, from reflection of said first transmit signal at impedance discontinuities encountered by said first transmit signal and a second reflection signal resulting from reflection of said second transmit signal at impedance discontinuities encountered by said second transmit signal back from said surface;

a mixer connected to said microwave signal source and to said propagating device and configured to mix said first transmit signal and said first reflection signal to form a first intermediate frequency signal, and to mix said second transmit signal and said second reflection signal to form a second intermediate frequency signal; and processing circuitry connected to said microwave signal source and to said mixer, said processing circuitry comprising:

a microwave signal source controller configured to control said microwave signal source to generate:

said first transmit signal comprising a time sequence of a first number of discrete and mutually different frequencies defining a first bandwidth of said first transmit signal, said first transmit signal exhibiting a first ratio between said first bandwidth and said first number of discrete and mutually different frequencies; and said second transmit signal comprising a time sequence of a second number of discrete and mutually different frequencies defining a second bandwidth of said second transmit signal, said second transmit signal exhibiting a second ratio between said second bandwidth and said second number of discrete and mutually different frequencies being different from said first ratio;

a signal processor configured to:

determine a first data set indicative of a first set of surface echo candidates based on said first intermediate frequency signal received from said mixer; and determine a second data set indicative of a second set of surface echo candidates based on said second intermediate frequency signal received from said mixer;

a comparator configured to compare said first data set and said second data set to identify subsets of surface echo candidates from said first set of surface echo candidates and said second set of surface echo candidates indicating reflection of said transmit signal at impedance discontinuities at the same level in said tank; and a determinator configured to determine said filling level based on said subsets of surface echo candidates from said first set of surface echo candidates and said second set of surface echo candidates.

13. The radar level gauge system according to claim 12, wherein said signal processor further comprises:

transformation circuitry configured to:

transform said first intermediate frequency signal to a first frequency spectrum; and transform said second intermediate frequency signal to a second frequency spectrum.

14. The radar level gauge system according to claim 12, wherein said transformation circuitry is further configured to:

transform said first frequency spectrum to a first echo representation indicating a distance to each of said surface echo candidates in said first set of surface echo candidates; and transform said second frequency spectrum to a second echo representation indicating a distance to each of said surface echo candidates in said second set of surface echo candidates.

* * * * *